(12) United States Patent
Hodges

(10) Patent No.: US 6,219,751 B1
(45) Date of Patent: Apr. 17, 2001

(54) DEVICE LEVEL COORDINATION OF ACCESS OPERATIONS AMONG MULTIPLE RAID CONTROL UNITS

(75) Inventor: Paul Hodges, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/069,070

(22) Filed: Apr. 28, 1998

(51) Int. Cl.[7] ............................ G06F 12/14; G06F 13/14
(52) U.S. Cl. .............................................. 711/114; 711/154
(58) Field of Search ........................... 711/111, 112, 114, 711/154, 155

(56) References Cited

U.S. PATENT DOCUMENTS

| 4,207,609 | 6/1980 | Luiz et al. | 364/200 |
|---|---|---|---|
| 4,761,785 | 8/1988 | Clark et al. | 371/51 |
| 4,914,656 | 4/1990 | Dunphy, Jr. et al. | 371/10.2 |
| 5,265,098 | 11/1993 | Mattson et al. | 371/11.1 |
| 5,278,838 | 1/1994 | Ng et al. | 371/10.1 |
| 5,530,948 | * 6/1996 | Islam | 395/182.04 |

* cited by examiner

*Primary Examiner*—Kevin L. Ellis
(74) *Attorney, Agent, or Firm*—R. Bruce Brodie; Randall J. Bluestone

(57) ABSTRACT

A method and apparatus for serializing access to disk arrays shareable among a plurality of RAID control units at a substantial reduction in intercontrol unit communication by (a) defining a lock function over the parity image blocks at each of the disk drives of a shared disk array; and (b) executing a path expression at each accessing control unit, the path expression includes requesting a lock from the drive on the parity image and enforcing a busy-wait until a lock is granted, executing the RAID function, and then releasing the lock.

19 Claims, 5 Drawing Sheets

Flow of Control for RAID Device Level Parity Block Locking

Demand/Response DASD Storage
Subsystem-Reserve/Release
on Devices or Extents

RAID Array with a Single Controller

Multiple Arrays with Dual RAID Controllers

Flow of Control for RAID Device Level Parity Block Locking

DEVICE LEVEL COORDINATION OF ACCESS OPERATIONS AMONG MULTIPLE RAID CONTROL UNITS

FIELD OF THE INVENTION

This invention relates to storage subsystems formed from cyclic, multitracked devices, and more particularly to storage subsystems of the RAID 3 or RAID 5 type in which multiple RAID control units share access to arrays of such cyclic devices.

DESCRIPTION OF RELATED ART

The succeeding paragraphs briefly describe the data availability, storage capacity, and data rate tradeoffs among several RAID disk array configurations. This is followed by a discussion of aspects of the prior art management of accessing disk drives and arrays shared among two or more control units.
RAID Arrays Fault Tolerance, and Recovery In the prior art, RAID arrays of cyclic, tracked storage devices have found use in increasing the availability and reliability of stored data. The increased availability and reliability is achieved by dedicating a portion of the capacity to redundant information. In the presence of corrupted data or unavailable disk drives, the RAID control unit uses the redundancy to either reconstruct data on the fly, rebuild data on spare disks, or both. Thus, in a RAID 1 configuration, each update to data is written out to two disks. If any single disk fails, then the duplicate disk is electronically switched into the access path as its replacement. Although remarkably fault tolerant, an N disk RAID 1 array has a storage capacity limited to N/2 of its drives.

A RAID 3 configuration is data rate intensive and sustains a data rate N times the rate of a single disk. Also, it creates a logical track N times the size of a physical track. In RAID 3, N data blocks at a time are written or read across N counterpart synchronized disks and a parity image on an $N+1^{st}$ drive. Unfortunately, the high data rate also means that the concurrency rate is low. That is, only one application can access the drives.

In contrast, a RAID 5 configuration is transaction or concurrency intensive. As illustrated in Clark et al., U.S. Pat. No. 4,761,785, "Parity Spreading to Enhance Storage Access", issued Aug. 2, 1988, N−1 data blocks and an associated parity image are written across N asynchronous disk drives in the same physical address range such that no single drive stores two or more blocks from the same parity group, and such that no single drive stores all of the parity blocks.

It should be recalled that the RAID 3 configuration is affected by adverse loading. Each read and write requires that all drives be accessed, including the parity drive. However, in the RAID 5 context, adverse loading can be minimized in several ways. First, since parity is spread out among the disks, no single disk bears all the parity loading. Indeed, Mattson et al., U.S. Pat. No. 5,265,098, "Method and Means for Managing DASD Array Accesses When Operating in Degraded Mode", issued Nov. 23, 1993, proposed spreading data and parity blocks out among the disks in a pattern forming a balanced incomplete block design such that adverse loading would be minimized, even where a disk failed and the array was operating in a fault-tolerant mode.

There have been many proposals both for operating RAID 5 arrays and the like in degraded mode and returning the information state of any given array back to a fault-tolerant mode. In this regard, Dunphy, Jr. et al., U.S. Pat. No. 4,914,656, "Disk Drive Memory", issued Apr. 3, 1990, describe the use of a pool of hot spare disks available for rewriting in the event of single disk failure and in the presence of single image parity groups.

Similarly, Ng et al., U.S. Pat. No. 5,278,838, "Recovery From Errors in a Redundant Array of Disk Drives", issued Jan. 11, 1994, disclose the online scheduling and rebuilding of data on a spare DASD or the like, the data having been stored on unavailable disk drives in a type RAID 1, 4, or 5 array. The Ng invention relies upon coded error detection and assumes that failures would occur as random independent events.
Management of Accessing Among RAID Control Units and Shared Disk Arrays In a RAID 5 disk array, updating one or more of the N blocks in a stripe stored on N disks requires four or more access operations and the recalculation of the parity block image. The data and parity blocks move between a control unit resident cache or buffer and two or more of the disk drives. The operations consist of (1) reading the old data block from disk; (2) reading the old parity block from disk; (3) writing the new data block to disk, recalculating new parity as the XOR of the old parity, old data, and the new data; and (4) writing the new parity block to disk.

When two or more RAID control units seek access to data on drives in a shared array, there are myriad opportunities to corrupt data, such as where RAID read and write operations occur concurrently and where they involve more than one drive. Avoidance requires that RAID operations be coordinated in order to preserve data integrity. In the prior art, the RAID control units have been required to communicate and negotiate a lock-like state serializing their access to the disk data. The constructs for serializing access between the RAID control units would frequently be some form of shared variable or message passing. Shared variable synchronization includes test and set, semaphores, conditional critical regions, monitors, or path expressions.

While any one of these constructs, when utilized by both control units, serialize access to the same resource and preserve data integrity, they require that each RAID control unit devote considerable bandwidth to originating and sending messages as well as receiving and interpreting messages from the other control unit. Given that RAID control units may be configured in network relationships, the message traffic required to synchronize access to shared disk arrays becomes nonlinear. Cumulatively, the network bandwidth dedicated to synchronizing communications reduces the bandwidth available to either data rate or concurrency, or other storage and data management tasks.

SUMMARY OF THE INVENTION

It is accordingly an object of this invention to devise a method and apparatus for serializing access to disk arrays shareable among a plurality of RAID control units at a substantial reduction in intercontrol unit communication.

It is yet another object that such method and means effectuate serialized access to data on said devices independent of any consistent state as among concurrently accessing RAID control units.

It is a related object that such method and apparatus minimize reduction in either data rate or concurrency as a function of differences among random or sequential access patterns.

The above objects are believed satisfied by a method and apparatus for selectably locking a transfer path between one of several RAID control units to a shared array of cyclic, multitracked storage devices (disk drives). The control units perform RAID functions on at least one data block and a parity image of a parity set defined over the disk drives. The blocks are distributed such that no single disk drive in the array stores more than one block from an associated data set.

The method steps include defining a lock function on each disk drive. This enables the disk drive to enqueue lock requests from accessing control units, grant lock requests to a requesting drive in enqueued order to an available parity image stored on the device, and to release the lock responsive to a control unit signal. The next step involves executing at the control unit a RAID function embedded within a path expression, a path expression being a construct for synchronizing and ordering the activity relationship between the control unit and one or more array drives. In this regard, the RAID function requests an explicit lock on at least one predetermined parity image from a counterpart device. Significantly, the execution of any RAID function is inhibited until grant of the lock by the counterpart disk drive as a form of busy-wait. When a lock is granted by the disk drive, the control unit then proceeds to execute the RAID function on at least one data block and parity image of an associated parity set from the counterpart devices. The control unit signals the drive upon termination of the RAID function, thereby causing the device to relinquish the lock.

In this invention, the RAID control units are preferably of a RAID 3 type and RAID 5 type or combination thereof. Both types satisfy the constraint that no single drive stores more than one block from the same parity set. Additionally, a RAID 5 array is further limited in that no single drive stores all the parity images for the parity sets defined onto the array.

A path expression comprises a composite function executed at a control unit specifying an ordering of uninterruptible procedures interpreted by at least one of the devices. It forms a coroutining relationship with at least one of the storage devices. The ordering includes effectuating lock access to the parity image on the counterpart device, executing a RAID function over at least one data block and the parity image, and relinquishing the lock access. Advantageously, each path expression executed at a first control unit is independent of the consistency state of every other RAID control unit.

In this invention, a RAID function is selected from a set consisting of reading, writing, or write modification of data blocks and parity image of a parity set, data block or parity image regeneration, and parity set rebuilding. Typically, such RAID functions include multiple read and write commands of which any lock request would be embedded in a first read or write command in the RAID function.

DESCRIPTION OF THE PREFERRED EMBODIMENT

Preliminary Comments and Clark as a RAID Array Paradigm

Before describing the preferred embodiment, several preliminary matters should be considered. First, in this preferred embodiment, the RAID arrays of choice are of the RAID 3 and RAID 5 types. Second, the general attributes of RAID device types 1–5 are fully described in the Clark et al. patent and the references cited therein. Third, the term "parity set" is any logical association of N data blocks and a parity image taken thereover as the $(N+1)^{st}$ block. Fourth, the terms "logical block" and "block" are used synonymously and refer to a fixed length of addressable storage extent used on a disk drive. Fifth, the term "enqueue" connotes the operation of placing a resource request or command in a queue or waiting list. Classically, enqueuing connotes a pair of synchronization primitives. The first primitive "enqueue" is the operation of placing a resource request in a queue under some discipline, such as FIFO. The request waits until the resource becomes available. At this point, the second primitive "dequeue" is invoked as the operation of placing the resource under the control of the requesting source and removing it from the queue or list.

In both RAID 3 and RAID 5 arrays, there are several ways of creating or defining parity sets over the disks. One convenient method is to define them by their storage proximity of blocks on disk drives as in the aforementioned Clark '785 patent or in the Mattson '098 patent.

In Clark, a parity image is formed from the data that is stored in the same range $R_1$ of contiguous physical addresses in each of N disks with the parity image also being stored in the range $R_1$ on the $N+1^{st}$ disk. The N+1 blocks collectively are termed a "stripe" or a parity set. In Clark, the location of the parity image is rotated or spread in a round-robin manner from stripe to stripe. From Clark, two logical relations can be discerned. First, the data blocks in the same parity set or stripe are resident in the same address range $R_1$ on different disks. Second, the data blocks are covered by the same parity image. A similar convention is expressed in Mattson.

Serialization of Access to a Shared Resource

In the past, concurrent access to shared disk data was managed either by high-level CPU lock-oriented serialization or significant intercontrol unit communications supporting a busy-wait condition. The embodiment in FIG. 1 illustrates a typical RAID 5 array as a substitute large logical disk positioned in a hierarchical storage subsystem with no intercontrol unit communications.

Figure 1:
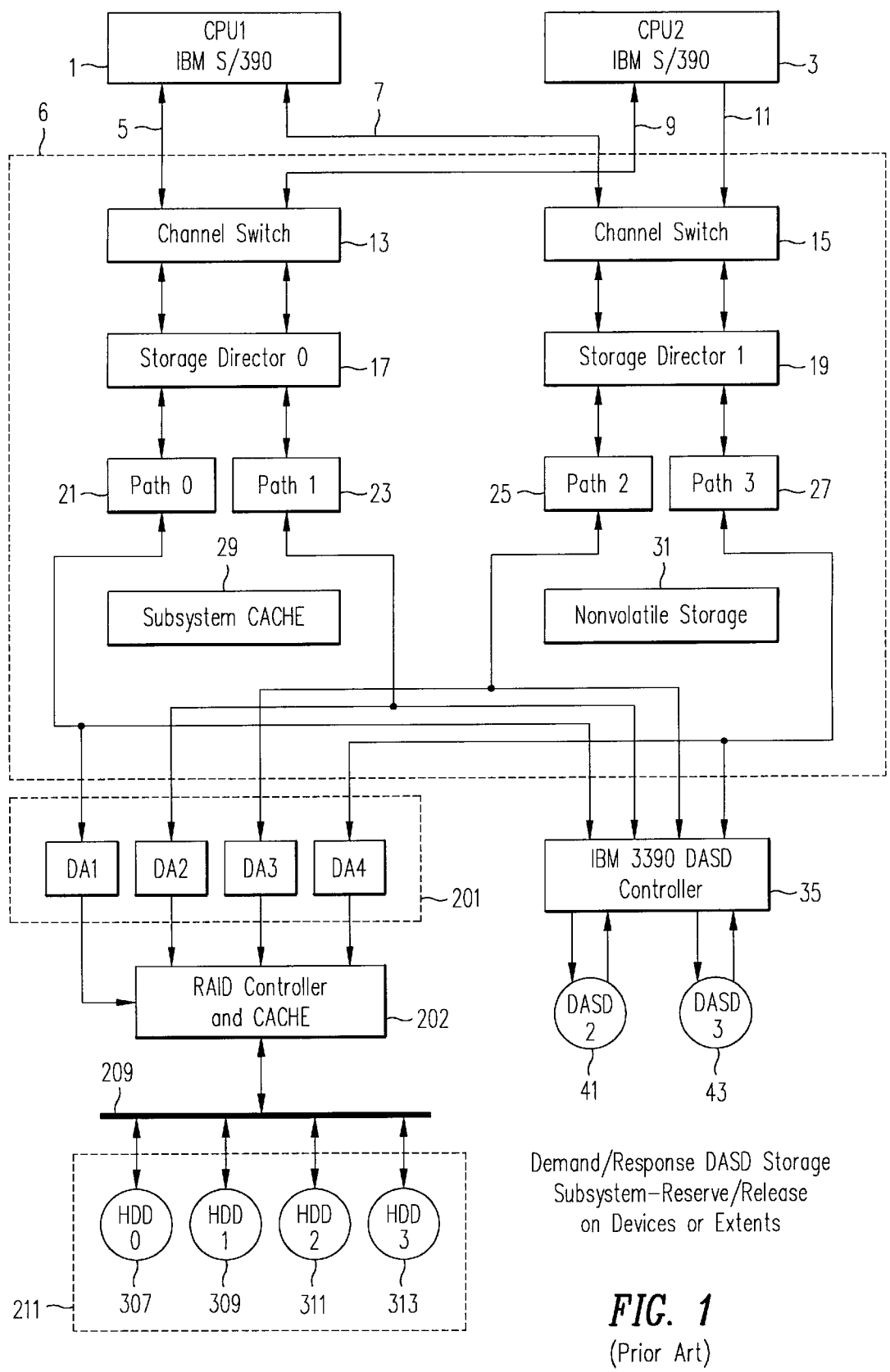
FIG. 1 shows a logical block diagram of a RAID 5 disk array in a hierarchical storage subsystem according to the prior art.

Referring now to FIG. 1, there is shown a logical block diagram of a RAID 5 disk array in a hierarchical storage subsystem according to the prior art. The RAID array 202, 211 is accessed by applications executing either on multitasking hosts CPU 1 or CPU 3, such as an IBM System/390 running under the IBM MVS operating system. The access is imposed over a path including the storage control unit 6 exemplified by an IBM 3990 SCU Mod 6. In this configuration, the RAID array 202, 211 is externally operated as a storage endpoint in much the same manner as conventional disk drives 41 and 43 (such as the IBM 3390) under control unit 35.

The subsystem depicted in FIG. 1 is designed such that data stored on any of the disk storage devices 211, 41, and 43 can be accessed over any one of at least two failure-independent paths from either one of the CPUs 1 or 3, although the system as shown provides four failure-independent paths. Illustratively, data on devices 211 can be reached over any one of paths 21, 23, 25, or 27. The same holds for data stored on devices 41 or 43 via control unit 35. A full description of this principle is to be found in Luiz et al., U.S. Pat. No. 4,207,609, "Method and Means for Path Independent Device Reservation and Reconnection in a Multi-CPU and Shared Device Access System", issued Jun. 10, 1980.

In FIG. 1, when two applications on the same or different CPUs seek concurrent access to the same data sets within the same data volume, the condition in MVS is resolved through the use of RESERVE/RELEASE or similar commands. Under the MVS operating system, RESERVE is a command that turns a hardware lock against an entire disk volume so that no other CPU may access it. For reasons previously mentioned, such high-level inspired serialization involves significant CPU processing overhead, denies path access to significant amounts of disk-stored data, and increases susceptibility to deadlock. The latter occurs when applications on CPU 1 and CPU 3 each reserve two separate disk volumes, and then each requests the volume that the other has reserved.

Single and Shared RAID Disk Arrays

Figure 2A:
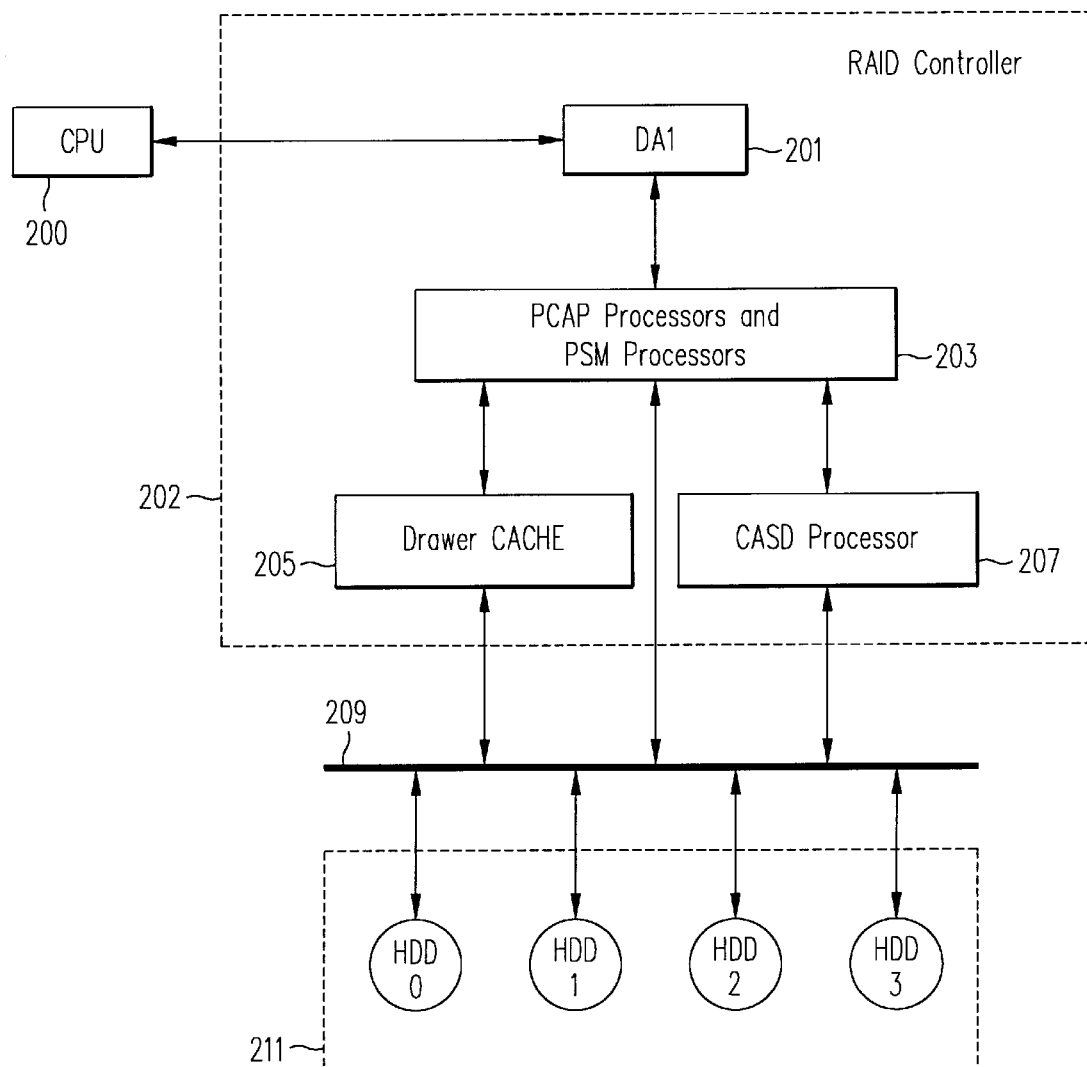
FIGS. 2A–2B respectively depict a RAID-organized disk storage subsystem directly attached to a single host and a configuration where at least two disk arrays are attached between two or more RAID control units.

Referring now to FIG. 2A, there is shown a RAID 5 disk array organized storage subsystem directly attached to a single host CPU 200. In this configuration, a RAID 5 subsystem includes a control unit 202 and four attached disk drives 211, otherwise denominated as in FIG. 1 as disks 307, 309, 311, and 313 such as may be found in an IBM RAMAC Array DASD attaching one or more Enterprise System (S/390) ECKD channels through an IBM 3990 Mod 3 or 6 storage control unit. The RAMAC array disk storage subsystem comprises a rack with a capacity between 2 to 16 drawers. Each drawer includes four disk drives HDD0–HDD3 (211) and a control unit 202. The RAID control unit or control unit 202 includes cooling fans, control processor 207, ancillary processors 203, and a nonvolatile drawer cache 205.

Functionally, a device attachment unit 201 provides electrical and signal coupling between the CPU 200 and one or more RAID 5 drawers. As tracks are staged and destaged through this interface, they are converted from variable-length CKD format to fixed-block length FBA format by the ancillary processors 203. In this regard, drawer cache 205 is the primary assembly and disassembly point for the blocking and reblocking of data, the computation of a parity block, and the reconstruction of blocks from an unavailable array disk drive. A typical configuration would consist of several drawers. An additional drawer (not shown) would include four disk drives operable as "hot spares". This is an alternative to siting a "hot spare" within each of the operational drawers.

In this embodiment, the four disk drives 307–313 are used for storing parity groups. If a dynamic (hot) sparing feature is used, then the spare must be defined or configured a' priori in the spare drawer. Space among the four operational array devices is distributed such that there exists three DASD's worth of data space and one DASD's worth of parity space. It should be pointed out that the disk drives 211, the cache 205, and the processors 203 and 207 communicate over a SCSI-managed bus 209. Thus, the accessing and movement of data across the bus between the disk drives 211 and the cache 205 is closer to an asynchronous message-type interface. A typical layout of CKD tracks and parity images of groups of CKD tracks over the disk drives follows the pattern described in the description of the prior art with reference to the Clark '785 patent.

Figure 2B:
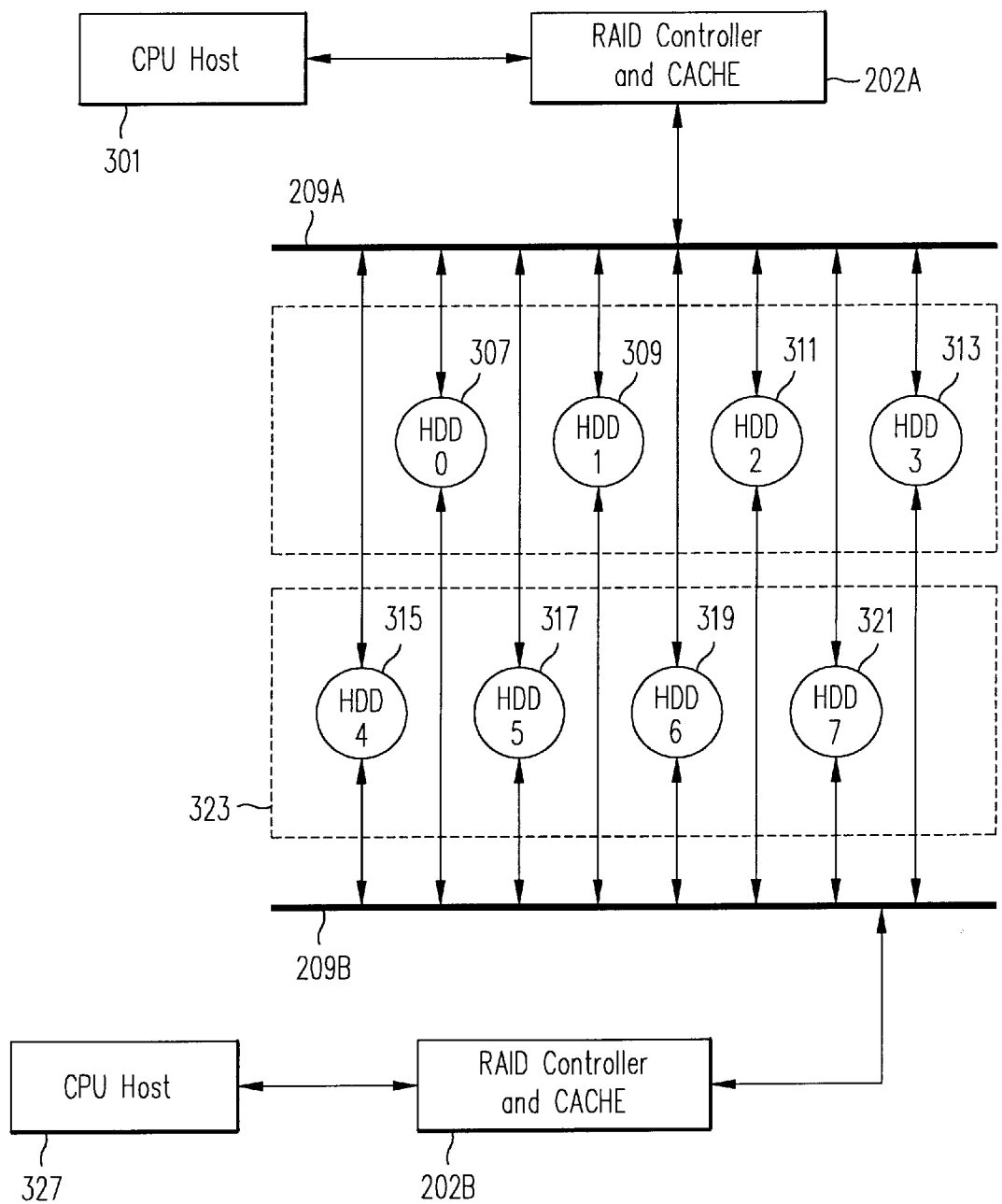

Referring now to FIG. 2B, there is shown a configuration where at least two disk arrays 211 and 213 are attached between two or more RAID control units 202 A and 202B via SCSI buses 209A and 209B. Alternatively, two or more disk drives could be multidropped between the pair of buses. For purposes of this discussion, the arrays are logically organized such that array 211 comprises disks 307–313 and array 213 comprises disks 315–321. As pointed out in the discussion of the embodiment of FIG. 1, each disk drive is at least dual ported. Thus, either RAID control unit may access every one of the drives in either disk array.

The problem confronted in this invention is where CPU 301 and CPU 327 concurrently request access to drives within the same parity set or stripe. Indeed, the shared access conflict is expected to increase over time as client/server and network models proliferate.

Disk Drive Execution Environment

The solution broadly requires (a) defining a lock function over the parity image blocks at each of the disk drives of a shared disk array; and (b) executing a path expression at each accessing control unit, the path expression includes requesting a lock from the drive on the parity image and enforcing a busy-wait until a lock is granted, executing a RAID function, and releasing the lock. This requires that each drive have sufficient processing and local memory capability. In this regard, reference should be made to FIG. 3.

Figure 3:
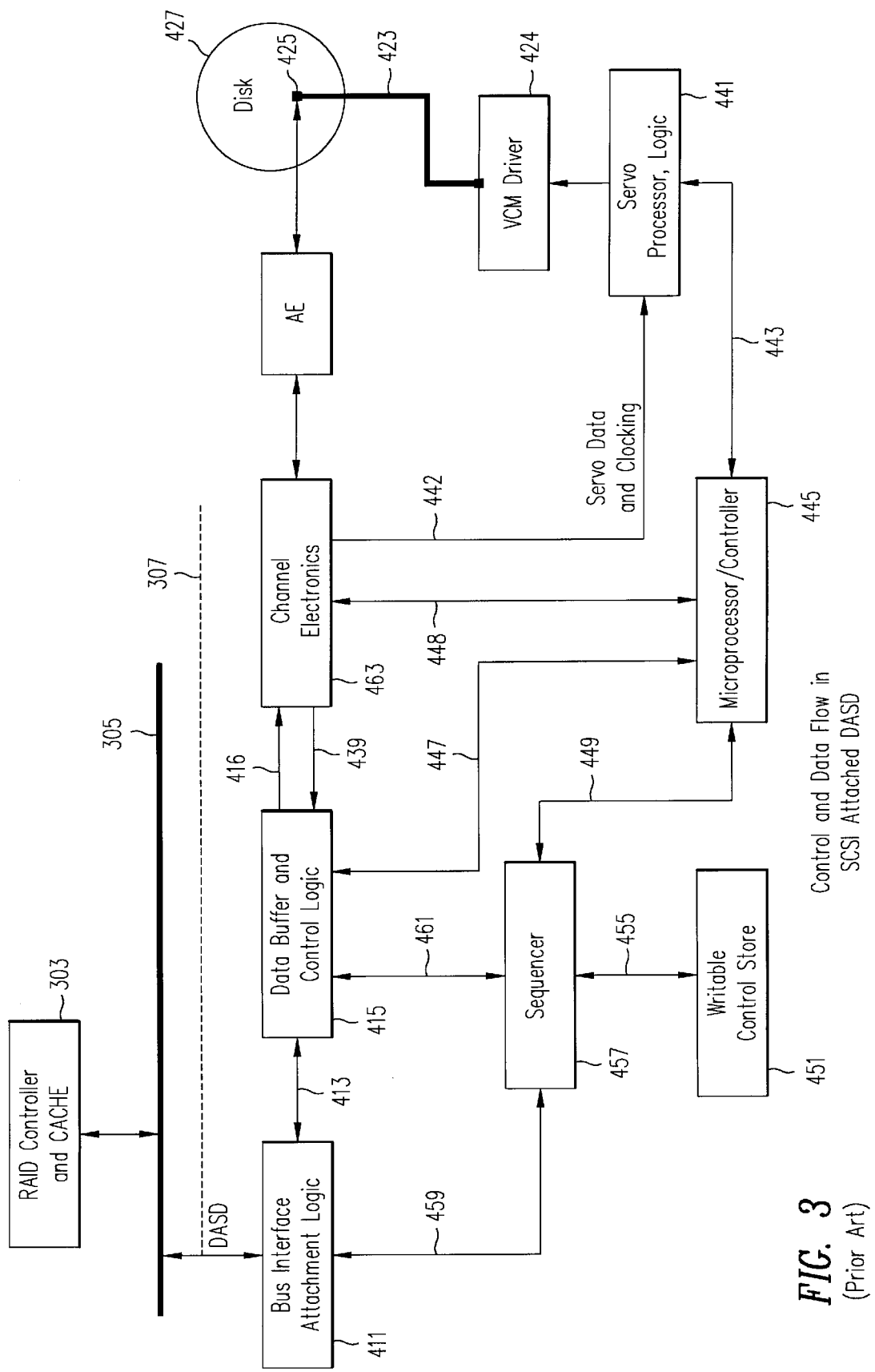
FIG. 3 sets out the control and data flow of the command and data transfer paths of a typical SCSI disk drive array attached as in FIGS. 2A and 2B.

Referring now to FIG. 3, there is shown the control and data flow of the command and data transfer paths of a typical SCSI disk drive, such as would be used in arrays 211 or 213. The drive is organized around two processing paths, namely a command processing path and data transfer path. The command processing path includes a bus interface 411, a sequencer 457, a microprocessor 445, and a servo processor 441. The data transfer path includes the bus interface 411, a data buffer 415, channel electronics 463, a read/write head 425, and a cyclic, multitracked disk 427.

In FIG. 3, data is streamed out to or derived from addressed tracks on the magnetic or optical disk 427 over the data path, while storage (read/write) and access (seek/set sector) commands are processed by a command path also within the disk drive 307. Commands and data from the host 1 are passed through the interface 411. As suggested, the commands are interpreted and processed over the path including a sequencer 457, the microprocessor control unit 445, servo processor logic 441, and the physical accessing mechanism 423–425 to the cyclic, tracked disk 427. In contrast, data is passed to or from tracks on the disk 427 via the interface 411, a data buffer 415, channel electronics 463, a read/write head 425 adjacent to the recorded data on the track, and amplifier electronics 422.

The above-mentioned lock facility can be expressed at the disk drive 307 as a series of functions written into control store 451. Appropriate lock constructs, such as a lock table or list-lock queue and command queue, are maintained at the microprocessor 445. The thesis of this invention is that the addition of appropriate locking functions and queues of lock requests in the disks drives can be used to coordinate the functions of accessing RAID control units to both maintain data integrity and eliminate intercontrol unit communication. More particularly, drive-level locking combined with executing access operations as path expressions (composite functions) will avoid conflicting operations between the control units.

Lock Commands

Implementation of any lock facility requires defining four additional device commands, namely, Read/Lock, Write/Lock, Lock, and Release/Lock.

The Read/Lock command is issued by the control unit to a disk drive in an array storing a parity image addressed by the command. The Read/Lock command also recites a range of logical block addresses (LBAs) which prospectively are involved in update, rebuild, or regeneration operations. A command tag serves as an identifier for later release of the lock.

The Read/Lock command can be processed in one of two ways. A first approach is for a control unit to send only the lock request and delay sending the read command until after receipt of the lock grant by the control unit from the disk drive. A second approach is for the control unit to send both parts of the command to the disk drive. If any part of the LBA range is already locked when the disk drive receives the Read/Lock command, the lock request as represented by this command will be enqueued at the disk drive until any previous lock on this LBA range is released. As soon as the lock becomes available, the drive can execute the read command. The first approach places the onus on the control unit, while the second passes the same to the disk drive.

The Write/Lock command is issued by the control unit to a disk drive in an array with a range of LBAs for a full parity set or stripe write. The lock request and write delay is processed by the control unit and the disk drive in the same manner as is used in processing the Read/Lock command. However, after the lock has been granted, the command is executed as a normal write operation with respect to designated data blocks and the parity image as reflected in the LBA address range designation. As mentioned above, the use of a single command allows earlier queuing of the write operation at the disk drive.

The Lock command is issued by the control unit to a disk drive in an array storing a target parity image with a range of LBA addresses for either a partial stripe Write or a full or partial stripe Read. The lock portion is implemented in the same manner as that of the Read/Lock command. In this command set, there is no implied read or write operation. Any read or write command to the parity drive must be issued or given effect only after the lock has been granted.

The Release/Lock command is issued with an appropriate identifier (initiator and tag) when the sequence for which the lock was issued is complete. This also pertains if the sequence must be canceled. In this regard, the Release/Lock command operates to cancel the corresponding lock. The command is rejected if there is no lock in effect or queued with that identifier.

Illustrative Path Expressions with Included RAID Functions

As previously mentioned, a path expression is a synchronization construct to secure an interference-free interaction between a control unit and a drive storing a target parity image. Other terms, such as composite function or composite operation, may be used synonymously.

Three illustrative expressions set out below are Update Data, Rebuild Data, and Regenerate Data. The expressions are set out in a pseudo-code-like format and are executable by any of the control units such as 202A or 202B in FIG. 2B with respect to a disk drive 307 in array 211.

I—Update Data (a) Issue a Read/Lock command with a predetermined tag and LBA range to the parity disk drive.

(b) When an indication has been received from the disk drive that the lock has been granted, issue the Read command (this constitutes reading of old data for Update Write purposes).

(c) When the old data block has been read, issue a Write command to the disk drive storing the old data block to update the data in place.

(d) When the old parity has been received by the control unit from execution of the Read/Lock command at the parity disk drive, generate a new parity and issue a Write command to the parity drive to update in place the parity image block.

(e) When the control unit receives indication that both Write commands have been executed, issue a Release/Lock command to the parity drive.

II—Rebuild Data (a) Issue a Read/Lock with a tag and LBA range to the parity drive.

(b) When an indication has been received from the disk drive that the lock has been granted, issue a Read command to each of the data drives in the target parity set.

(c) When indications have been received that all of the Read commands have been executed, issue a Write command to the drive being rebuilt.

(d) When indication has been received that the Write command has been completed, issue a Release/Lock command to the parity drive.

III—Regenerate Data (a) Issue a Read/Lock with a tag and LBA range to the parity drive.

(b) When an indication has been received from the disk drive that the lock has been granted, issue a Read command to each of the data drives in the target parity set.

(c) When indications have been received that all of the Read commands have been completed, issue a Release/Lock command to the parity drive.

(d) Transfer regenerated data to the host CPU indpendent of the disk drive operation.

Lock Constructs and Processing at the Disk Drives

It was pointed out that contemporary disk drives, such as depicted in FIG. 3, include significant local operation scheduling and processing capacity. For this reason, each disk drive will include several lock management constructs sited in its local processor memory or equivalent. These constructs include a Command Queue, a Lock List, and a Lock Queue.

A Command Queue is an ordered list of executable commands received by a disk drive and not yet executed. Executable commands are those commands that inherently either do not require locks or that have locks in effect. Commands in the Command Queue may be reordered by the disk drive to optimize performance.

A Lock List is a list of granted locks currently in effect. A lock list associates a command identification with a corresponding storage address extent. Significantly, address extents must not overlap.

A Lock Queue is an ordered list of lock requests or pending locks. Each lock request or lock queue entry associates a command identification with a corresponding extent of disk drive addresses. When a preexisting lock is released, the lock discipline requires that the list be searched for the first command for which a new lock can be granted.

Figure 4:
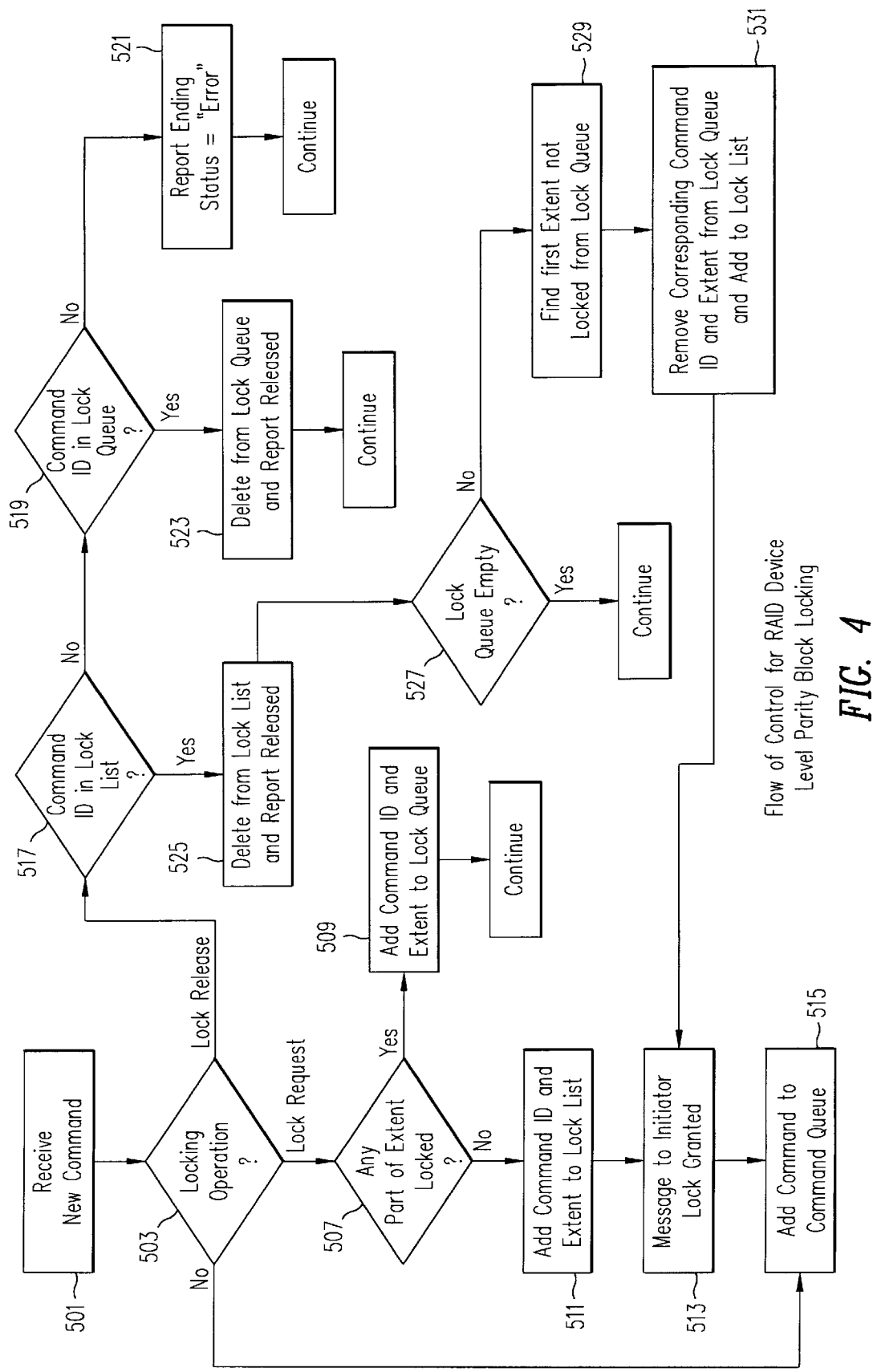
FIG. 4 illustrates the flow of control for RAID device level parity block locking according to the invention.

Referring now to FIG. 4, there is shown the flow of control for RAID device level parity block locking according to the invention. Each new command is received by a disk drive in step 501 and assessed in step 503 as to whether it is a lock release, a lock request, or none of the above. If it is a lock release, control is transferred to step 517. If it is a lock request, control transfers to step 507. If none of the above, then the process jumps to step 515 where the command is added to the command queue.

If the command is a lock request, step 507 determines whether any part of the LBA address range as recited in the new command is already under lock. If the address range is currently subject to another lock, then the new command identification (ID) and the address extent are added to the lock queue in step 509. On the other hand, if the extent is not under lock, the new command ID and extent are added to the lock list in step 511. At some point time subsequent, the disk drive grants the lock in step 513 and adds the command ID and extent to the command queue.

If the command as tested in step 503 is a lock release, then it is examined in step 517 as to whether the command ID and extent are already in the lock list. The presence of the command ID in the lock list will cause it to be deleted and the lock released in step 525. The lock queue will be tested for empty in step 527. If it is not empty, the lock queue is searched in step 529 and the first extent and associated command ID that are not locked are removed from the lock queue and added to the lock list in step 531. This further results in a lock being granted thereon in step 513 and the command added to the command queue in step 515.

For completeness, it should be said that if a lock release is not in the lock list per step 517 and is not in the lock queue per step 519, then an error is reported in step 521. However, if it is in the lock queue per step 519, then it is deleted from the queue per step 523.

Example of the Lock Processing

Suppose a series of commands have been received by disk drive 307 from a RAID controller in a predetermined order. Each command is associated with a command ID and an extent or range of addresses over which the command will operate. The command order is stipulated as follows:

TABLE 1

| Command ID | LBA Extent | Lock Status of LBA Extent |
|---|---|---|
| A1 | 1000–1500 | Yes-effected |
| B1 | 5000–6000 | Not required |
| A2 | 3000–3100 | Yes-effected |
| A3 | 1300–1600 | Yes-queued until release by A1 |
| A4 | 6500–7000 | Not required |
| A5 | 3000–3500 | Yes-queued until release by A2 and B2 |
| B2 | 3200–4000 | Yes-effected |
| B3 | 2900–3100 | Yes-queued until release by A2 |

The processor within the effected disk drive will form the lock constructs of a Command Queue, a Lock Queue, and a Lock List based on this example and the above definitions.

The Command Queue would be:

TABLE 2

| Command ID | LBA Extent |
|---|---|
| A1 | 1000–1500 |
| B1 | 5000–6000 |
| A2 | 3000–3100 |
| A4 | 6500–7000 |
| B2 | 3100–4000 |

The Lock Queue would be:

TABLE 3

| Command ID | LBA Extent |
|---|---|
| A3 | 1300–1600 |
| A5 | 3000–3500 |
| B3 | 1900–3100 |

The Lock List would be:

TABLE 4

| Command ID | LBA Extent |
|---|---|
| A1 | 1000–1500 |
| A2 | 3000–3100 |
| B2 | 3200–4000 |

Referring again to FIG. 4 together with Tables 1–4, it should be apparent that in processing the first entry in Table 1, say command A1, it would be identified as a lock request in step 503. Tracing it further, it would also be apparent that no part of its LBA extent was under lock per step 507. Consequently, command A1 would be added to the lock list in step 511 (Table 4) and the lock granted in step 513. Lastly, it would be added to the command queue (Table 2) in step 515.

In contrast, command A3, while constituting a lock request in step 503, does have a portion of its LBA extent subject to a lock under A1 in step 507. Accordingly, it is entered into the lock queue (Table 3) in step 509.

Commands B1 and A4 do not require locks and are moved directly onto the command queue (Table 2) per steps 503 and 515.

The processing of a lock release is not treated directly in the above example. However, command A5 will remain on the lock queue (Table 3) until locks associated with commands A2 and B2 are released. The lock release of A2 and B2 respectively by a control unit would be processed in a traverse including steps 503, 517, 525, 527 and 529 since the lock queue (Table 3) would not be empty.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the following claims.

What is claimed is:

1. A method for serializing access to individual storage devices in an array of storage devices, said array having parity groups of data blocks and an associated parity image block written across counterpart storage devices such that no drive stores more than one block of the same group, said array being addressable by two or more control units, comprising the steps of:

(a) defining a lock function over the parity image blocks at storage devices of the storage device array; and (b) executing a path expression at an accessing control unit, the path expression includes requesting a lock from the storage device storing the parity image of the parity group addressed by the control unit, and enforcing a busy-wait until a lock is granted by the storage device, executing a RAID function, and then releasing the lock.

2. The method according to claim 1, wherein the RAID function is one selected from a set consisting of modifying at least one data block and the parity image from at least one parity set on at least one device, and reconstructing at least one given data block or given parity image from remaining data blocks or parity image of any given parity set in the event of the unavailability of the given data block or parity image due to noise, corruption, or device failure and either staging it to a requesting control unit, writing it to at least one spare device or reserved area on the plurality of devices, or both.

3. The method according to claim 1, wherein the path expression comprises a composite function specifying an ordering of uninterruptible procedures interpreted by at least one of the devices, the ordering includes effectuating lock access to the parity image on the counterpart device, executing a RAID function over at least one data block and the parity image, and relinquishing the lock access.

4. The method according to claim 1, wherein each path expression being executed at a first control unit is independent of a consistency state of a second control unit.

5. The method according to claim 1, wherein the step of requesting a lock from the device includes the step of generating a lock-oriented command selected from a command set consisting of Read/Lock, Write/Lock, Lock, and Release/Lock, each lock-oriented command including a tag operable as an identifier for subsequent release of any granted lock.

6. The method according to claim 1, wherein requesting a lock from the storage device further comprises requesting a lock of a parity group corresponding to a range of Logical Block Addresses (LBAs) requested by the control unit, and wherein enforcing a busy-wait further comprises enforcing a busy-wait until a lock of the parity group corresponding to the range of LBAs requested by the control unit is granted.

7. The method according to claim 1, wherein each device has defined thereon one data block from a first parity set and a parity image of a second parity set, and wherein the method further comprises the steps at the device of enqueuing any lock request embedded in a first read or write command embedded in a RAID function, said device being responsive to at least one of a sequence of commands from a control unit executing a path expression during the pendency by the device of any current lock.

8. The method according to claim 7, wherein the RAID control units are of a type selected from a set consisting of type RAID 3 and type RAID 5 control units, and further wherein the RAID function is selected from a set consisting of reading, writing, or write modification of data blocks and parity image of a parity set, data block or parity image regeneration, and parity set rebuilding.

9. The method according to claim 7, wherein the step of executing a path expression includes the step of forming a coroutining relationship with at least one of the storage devices.

10. The method according to claim 7, further comprising terminating the RAID function which includes signaling the device upon completion of all read and write commands within the RAID function.

11. The improvement according to claim 10, wherein said first circuits include circuits for ascertaining whether a parity set covered by a lock request is concurrently subject to a lock in whole or in part and if subject to a lock said lock request is enqueued, and if not subject to a lock said lock request is granted and any command associated with said request in the path expression is placed on a command queue for execution by the device.

12. A method for establishing a locked path between one of a plurality of RAID control units and at least one of a plurality of cyclic, multitracked storage devices, said control units concurrently accessing selected blocks of data from parity imaged data sets defined over the devices, the blocks being distributed such that no single device stores more than one block from an associated parity imaged data set, comprising the steps at each of the RAID control units of:
  (a) defining a facility at each of the devices for enqueuing lock requests from said control units and for granting, maintaining, and releasing locks on the parity image resident on the device, said locks being granted in enqueued lock request order; and
  (b) executing a path expression at respective control units inclusive of a RAID function including:
    (1) requesting a lock from the device on the parity image of an associated set, at least one of whose blocks is addressed in a counterpart RAID function;
    (2) inhibiting execution of any RAID function with respect to any parity image or data blocks addressed by said RAID function until a lock is granted by the device storing the parity image to the counterpart RAID control unit;
    (3) executing the RAID function with reference to the parity image and data blocks addressed by the request responsive to the grant of the lock; and
    (4) terminating the RAID function and causing release of said lock by the granting device.

13. A method for path locking one of a plurality of RAID control units to at least one of a plurality of shareable cyclic, multitracked storage devices, the control units performing RAID functions on at least one data block and a parity image of a parity set defined over the devices, the blocks being distributed such that no single device stores more than one block from an associated data set, comprising the steps of:
  (a) defining a lock function on each device and causing said device to enqueue lock requests from accessing control units, grant lock requests to a requesting device in enqueued order to an available parity image stored on the device, and release of the lock responsive to control unit provided indicia; and
  (b) executing by at least one control unit of a path expression inclusive of a RAID function including:
    (1) requesting an explicit lock on at least one predetermined parity image from a counterpart device;
    (2) inhibiting the execution of the RAID function until grant of the lock by the counterpart device;
    (3) executing the RAID function on at least one data block and parity image of an associated parity set from the counterpart devices; and
    (4) terminating the RAID function and providing indicia to the lock granting device.

14. In a storage subsystem having a plurality of cyclic, multitracked recording devices, each device storing blocks of data, a first and a second RAID control unit and coupling said recording devices, each control unit including an arrangement responsive to a write request for generating a parity block as a function of a set of data blocks and for writing the data blocks and the parity block for each set out to predetermined ones of the recording devices such that no single device stores more than one block from any one set and such that no single device stores all the parity blocks for the recorded sets, wherein the improvement at each device comprises:
  a lock facility including a lock manager, a status list of lockable parity blocks and associated sets stored on the counterpart device, and a lock request queue;
  first circuits including the lock facility responsive to a lock request from one or more control units for identifying at least the parity image of a parity set and either granting a lock to the first requesting device in enqueued order on a parity image if resident and available on the device or enqueuing the same;
  second circuits including the lock facility for executing a sequence of accessing, updating, or regeneration tasks as specified by the control unit after grant of a lock; and
  third circuits including the lock facility for releasing the lock responsive to termination indicia from the counterpart control unit.

15. An article of manufacture comprising a machine-readable memory having stored therein indicia of a plurality of processor-executable control program steps for path locking one of a plurality of RAID control units to at least one of a plurality of shareable cyclic, multitracked storage devices, the control units performing RAID functions on at least one data block and a parity image of a parity set defined over the devices, the blocks being distributed such that no single device stores more than one block from an associated data set, said plurality of indicia of control program steps include:

(a) indicia of a control program step for defining a lock function on each device and causing said device to enqueue lock requests from accessing control units, grant lock requests to a requesting device in enqueued order to an available parity image stored on the device, and release of the lock responsive to control unit provided indicia; and (b) indicia of a control program step for executing a path expression inclusive of a RAID function by at least one control unit including:

(1) requesting an explicit lock on at least one predetermined parity image from a counterpart device;

(2) inhibiting the execution of the RAID function until grant of the lock by the counterpart device;

(3) executing the RAID function on at least one data block and parity image of an associated parity set from the counterpart devices; and (4) terminating the RAID function and providing indicia to the lock granting device.

16. A storage subsystem comprising:

a plurality of storage devices having a lock function to lock parity image blocks in the storage device; and a first and a second control unit, each coupled to the plurality of storage devices, wherein to access a storage device, an accessing control unit executes a path expression, the path expression includes requesting a lock from the storage device storing the parity image of the parity group addressed by the control unit, and enforcing a busy-wait until a lock is granted by the storage device, executing a RAID function, and then releasing the lock.

17. The storage subsystem of claim 16, wherein the storage devices have defined thereon one data block from a first parity set and a parity image of a second parity set, and wherein a storage device of the storage devices further comprises logic to enqueu any lock request embedded in a first read or write command embedded in a RAID function, said device being responsive to at least one of a sequence of commands from a control unit executing a path expression during the pendency by the device of any current lock.

18. The storage subsystem of claim 16, wherein executing a path expression includes forming a coroutining relationship with at least one of the storage devices.

19. The storage subsystem of claim 16, wherein the storage devices include logic to determine whether a parity set covered by a lock request is concurrently subject to a lock in whole or in part and if subject to a lock said lock request is enqueued, and if not subject to a lock said lock request is granted and any command associated with said request in the path expression is placed on a command queue for execution by the device.

* * * * *